Feb. 28, 1956 L. E. DERUETTE 2,736,074
CONTROL MECHANISM FOR MULTIPLE SASH WINDOW STRUCTURES
Filed Feb. 23, 1952 6 Sheets-Sheet 3

INVENTOR.
LOUIS E. DERUETTE
BY
George B White
ATTORNEY

Feb. 28, 1956 L. E. DERUETTE 2,736,074
CONTROL MECHANISM FOR MULTIPLE SASH WINDOW STRUCTURES
Filed Feb. 23, 1952 6 Sheets-Sheet 5

INVENTOR.
LOUIS E. DERUETTE
BY George B. White
ATTORNEY

United States Patent Office 2,736,074
Patented Feb. 28, 1956

2,736,074

CONTROL MECHANISM FOR MULTIPLE SASH WINDOW STRUCTURES

Louis E. Deruette, San Francisco, Calif.; Teresa Margaret Deruette, administratrix of said Louis E. Deruette, deceased; assignor to The Brookman Co., Inc., San Francisco, Calif.

Application February 23, 1952, Serial No. 273,032

10 Claims. (Cl. 20—42)

This invention relates to windows of the type making use of a plurality of sashes carried by a single frame.

In windows having a plurality of sashes automatic mechanism is provided for moving the sashes into open and closed positions and also at certain times to allow the independent movement of the lowermost sash apart and separately from the upper sashes, or selectively in unison with said upper sashes. The disadvantage of such multiple sash window and automatic mechanism used in the past is that they are not burglar proof. Usually when the lower sash is latched in locked position, by certain manipulation the sashes can be so arranged that they appear to the average watchman or janitor as though they were all closed and locked, but the upper sashes could be still opened and a burglar could enter by opening the upper sashes. In the automatic mechanisms heretofore used, in a certain position when the lower sash is closed in unison with the other sashes, all the sashes will be properly locked in position when the lower sash is locked. However, in this prior mechanism if after the closing of all the sashes the lower sash is partially opened so as to release it from the upper sashes and then closed again, it disengages the lower sash from the upper sashes although the position of the latter will not be altered. Another way of separating the upper sashes from the lower sash in closed position is to close the lower sash independently in closed position and then afterwards separately close the upper sashes in which instance in the old mechanisms the upper sashes will remain unlocked and disconnected from the lower sash and therefore could be separately opened.

The primary object of my invention is to provide a burglar proof automatic locking mechanism which will lock together the upper sashes and lower sash automatically every time when they are in closed position irrespective whether they were closed separately or in unison, or whether the lower sash was opened subsequently to the closing of the upper sashes. By my automatic lock device the disconnecting or releasing of the upper sashes from the lower sash while the upper sashes appear in closed position is positively obviated and therefore whenever the watchman observes all the sashes closed, all the sashes are actually locked together securely and as long as the lower sash is latched or fastened in closed position no access can be gained through the window by opening the upper sashes independently of the lower sash. My device also prevents the closing of the upper sashes accidentally by wind.

I am aware that some changes may be made in the general arrangements and combinations of the several devices and parts, as well as in the detils of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

In general the window in connection with which my automatic lock device is used, includes a window frame 1 in which are supported at least one or more upper window sashes 2 and a lower window sash 3. For the purpose of supporting the sashes in the window frame there is usually provided on each vertical side of the window frame a fixed channel 4 in each of which is movable a travel bar 6 for the upper sash or sashes 2. For each window on each side thereof there is a sash arm plate 7 and a sash link 8 which operate to swing the window sashes. The sash arm plate 7 is pivoted on the travel bar and is fixedly secured to the adjacent side of the window sash 2. The sash link 8 is pivoted on a fixed pivot at one end and at its other end it is pivoted to the same side of the window sash 2 or to the end of the arm plate 7, so that as the travel bar 6 travels in the channel 4 downwardly and shifts the pivoted end of the sash arm plate 7 downwardly it will turn the window sash outwardly into open position. When the travel bar 6 is moved upwardly it carries with it the pivoted end of the sash arm plate 7 and will cause the window sash 2 to turn inwardly into parallel position with the window frame 1 into its closed position.

Figure 1:
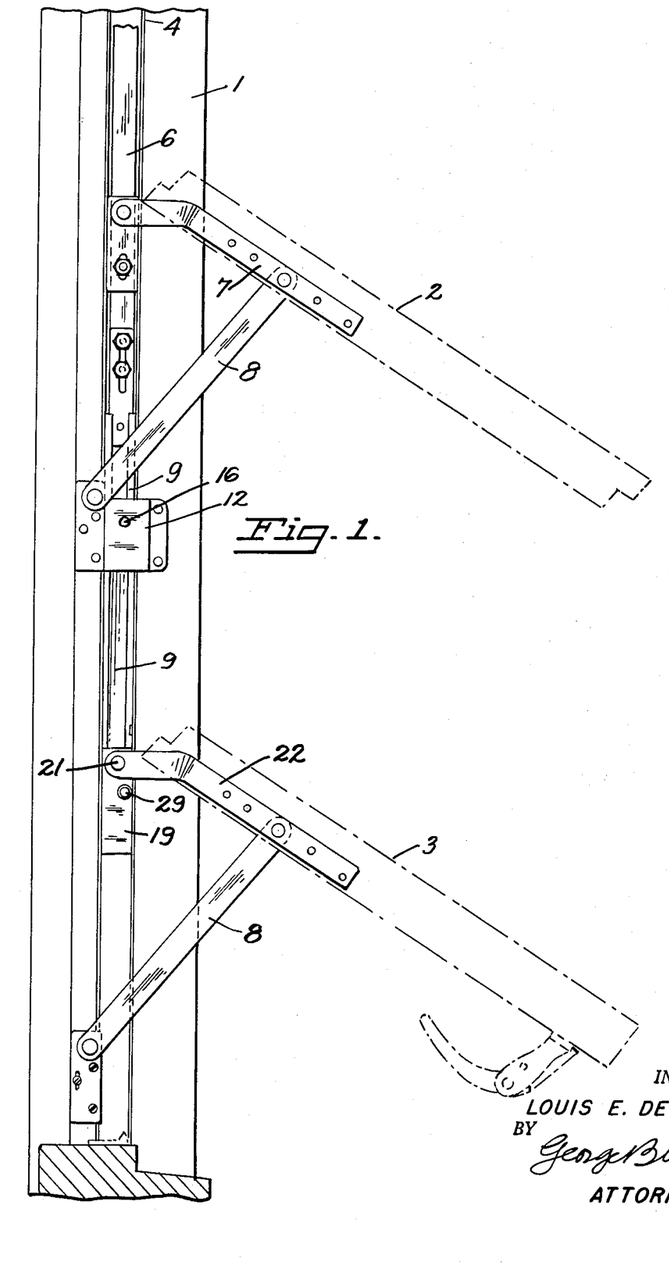
Fig. 1 is a fragmental side view of the control mechanism for a multiple sash window with all sashes open.
Figure 2:
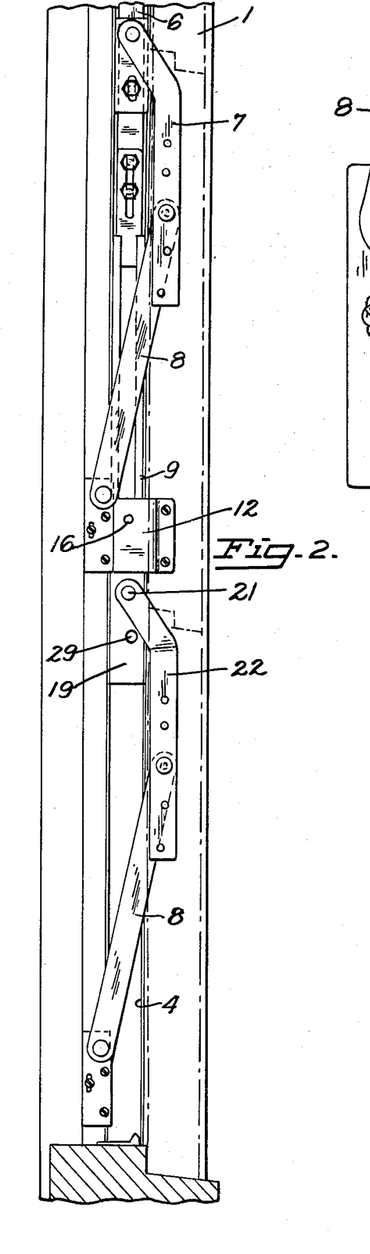
Fig. 2 is a fragmental side view of said control mechanism with the sashes closed.
Figure 3:
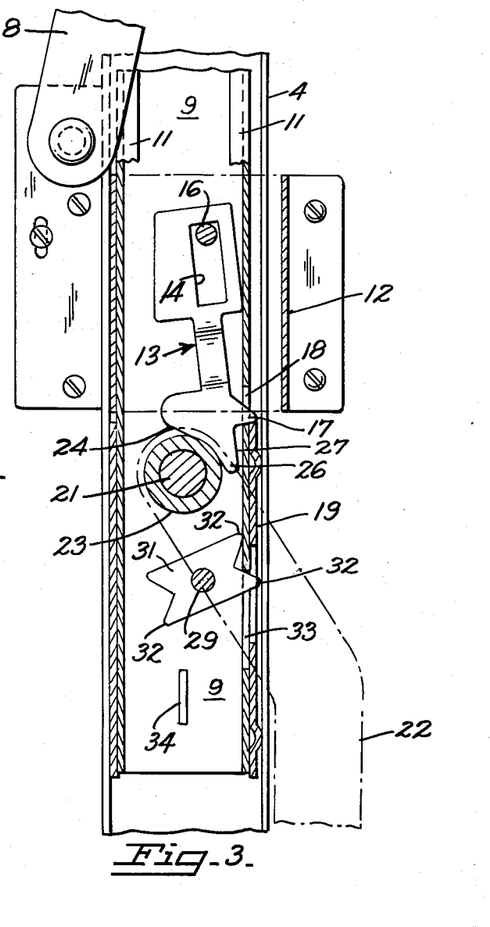
Fig. 3 is a sectional fragmental side view of the locking device for said control mechanism in the locked position of the sashes.
Figures 16, 17, 18, 19:
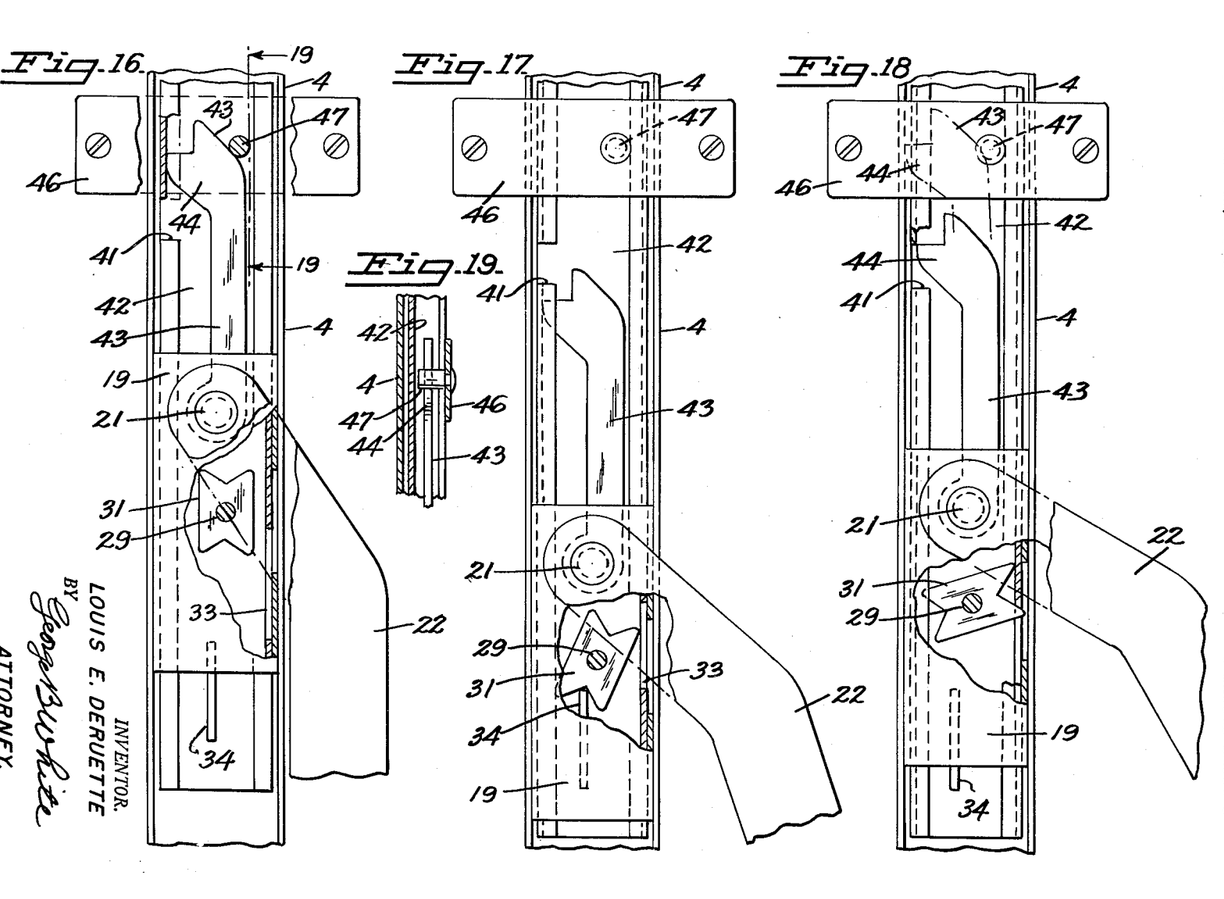
Figs. 16, 17 and 18 are partly sectional views of a modified control and locking mechanism in several relative operative positions of the sashes.
Fig. 19 is a fragmental sectional view taken on the lines 19—19 of Fig. 16.

In my device a tumbler operating or travel channel 9 is fixed to the lower end of the travel bar 6 and moves within said fixed channel 4 so as to move up and down with the travel bar 6. If so desired a single travel channel may be provided as shown in Figs. 16 to 18. The travel channel 9 is generally of U-shaped cross-section with its open side facing away from the fixed channel 4 and having inwardly turned flanges 11 along its longitudinal edges. A fixed strap 12 for my lock is extended over and across the fixed channel 4 above the top of the lower sash 3 and is fixedly secured to the window frame. This strap 12 is spaced from the flanges 11 of the travel channel 9 so as to accommodate therein a lock or bolt 13 as shown in Fig. 3. The lock or bolt 13 has an axially elongated slot 14 in its upper end which is slidably held on a pivot 16 secured in the strap 12 so that the bolt 13 can swing on the pivot and also be shifted upwardly or dropped downwardly by gravity. The upper end of the bolt 13 in which the slot 14 is located is formed into a head from which extends downwardly an abutment end of the bolt with a wedge shaped projection 17 extended toward one side of the travel channel 9. The travel channel 9 has a cut out or slot 18 on one side thereof which is in substantial alignment for registry with the projection 17 when all the sashes are closed and when the bolt 13 hangs by gravity from the pivot 16. In other words when the upper end of the bolt slot 14 rests upon the pivot 16 and when the sashes are closed, then the projection 17 is in registry with and extends into the keeper slot 18 and locks the sashes together. Therefore none of the sashes can be opened independently of the others.

For the above purpose the distance of the keeper slot 18 from the strap 12 in the closed position of the sashes is substantially equal to the distance between the top of the slot 14 and the point of the projection 17. The projection 17 has an inclined upper edge and a substantially horizontal lower edge which latter abuts against the lower end of the keeper slot 18 in the locked position of the sashes.

Figure 4:
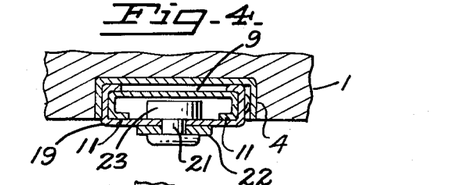
Fig. 4 is a cross-sectional view of the control mechanism above the pivot for the sash arm, on lines 4—4 of Fig. 5.
Figure 5:
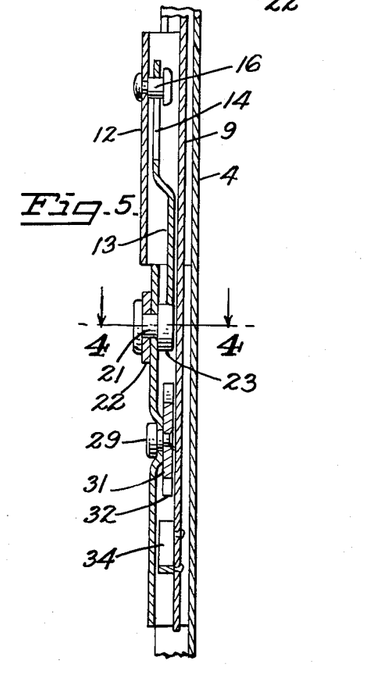
Fig. 5 is a fragmental longitudinal sectional view of the locking device for the control mechanism.
Figure 6:
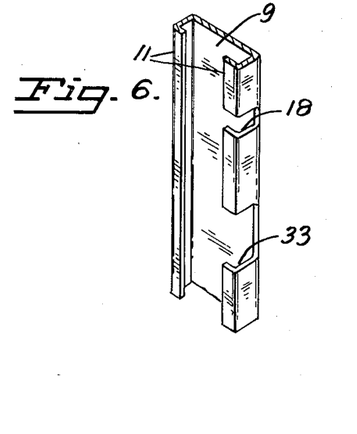
Fig. 6 is a fragmental perspective view of the travel channel of the control mechanism.
Figure 7:
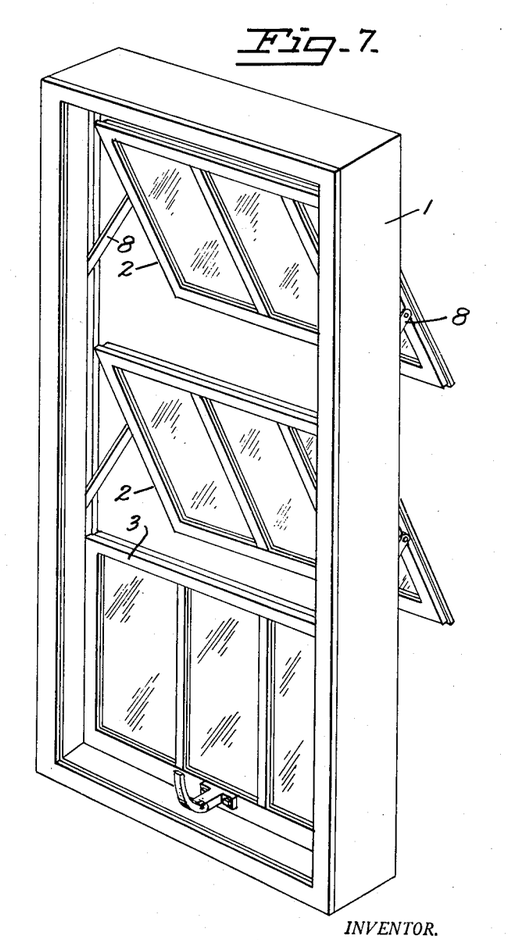
Fig. 7 is a perspective view of a window with the upper sashes open and the bottom sash closed.

For operation of this locking device and for the selective relative opening and manipulation of the lower sash and the upper sashes, I provide a tumbler case or cover 19 which is substantially of U-shaped cross-section inverted with flanges on the open edges thereof underlying the travel channel 9 so as to space the latter from the fixed channel 4, particularly as shown in Fig. 4. The tumber case or cover 19 is slidable over the travel channel 9. A pivot 21 on the tumbler case or cover pivotally supports the end of the sash arm plate 22 of the lowest window sash 3 so as to permit the opening and closing of this lower window sash 3 according to the downward or upward movements of the tumbler case 19, whether or not the tumbler case 19 moves with the travel channel 9.

On the sash arm plate pivot 21 and on the inside of the tumbler case and located within the travel channel 9 is a cam 23 which cam is so aligned with the lower inclined edge 24 of the bolt 13 as to normally urge the bolt 13 outwardly for projecting the projection 17 into the keeper slot 18. Whenever the tumbler case 19 is moved upwardly by the closing of the lower sash 3 and without also closing the upper sashes 2, the travel channel 9 remains stationary and the keeper slot 18 is not aligned with the bolt projection 17, thus the cam 23 engages the lower end of bolt 13 in the manner shown in Fig. 8 and pushes the entire bolt 13 upwardly as permitted by the elongated slot 14 in the head of the bolt 13. When subsequently the upper sashes 2 are closed and the travel bar 6 and the travel channel 9 therewith are pulled upwardly, then the keeper slot 18 is located in registry with the projection 17 and then the bolt 14 by action of gravity and of the lateral pressure by the cam 23 swings outwardly and drops downwardly to allow the locking engagement between the projection 17 and the keeper slot 18 as heretofore described. The curved edge 24 of the lower end of the bolt 13 is curved so that the point or tip 26 is formed so that one edge 27 thereof is straight and generally at right angles to the lower edge of the projection 17 and opposite inner edge thereof namely the edge 24 farthest from the keeper slot 18 is inclined and diverges upwardly and is then curved outwardly toward the other side of the travel channel 9. Thus when the cam 23 engages the tip 26 at a time when the travel channel 9 is lowered and the keeper slot 18 is not in registry with the projection 17, then the said cam 23 is in engagement with the lower end of the inclined edge 24 so as to exert an upward and lateral push toward and against the side of the travel channel 9, and thus it holds the cutaway or curved edge 24 alongside the cam 23 downwardly toward the side of the travel channel 9. Whenever the keeper slot 18 reaches the position in registry with the projection 17 the projection 17 is pushed into the keeper slot 18.

On another pivot 29 in the tumbler case 19 and spaced below the sash arm plate pivot 22 is pivoted a tumbler 31 the opposite ends of which are cut in a generally V-shape so as to form a pair of spaced points with converging inner inclined edges. The length of the tumbler 31 is such that when the tumbler 31 is in horizontal position then the points 32 thereof project into a tumbler slot 33 in the side flange of the travel channel 9 so as to connect the tumbler case 19 to the travel channel 9 and thereby move all the sashes in unison. For this purpose the tumbler pivot 29 is offset with respect to the center line of the tumbler case 19 toward the tumbler slot 33. The width of the tumbler 31 is such that it freely moves within the travel channel 9 whenever in a vertical or in slightly inclined position for independent manipulation of the lower sash separately from the upper sashes and vice versa.

Figures 8, 9, 10, 11:
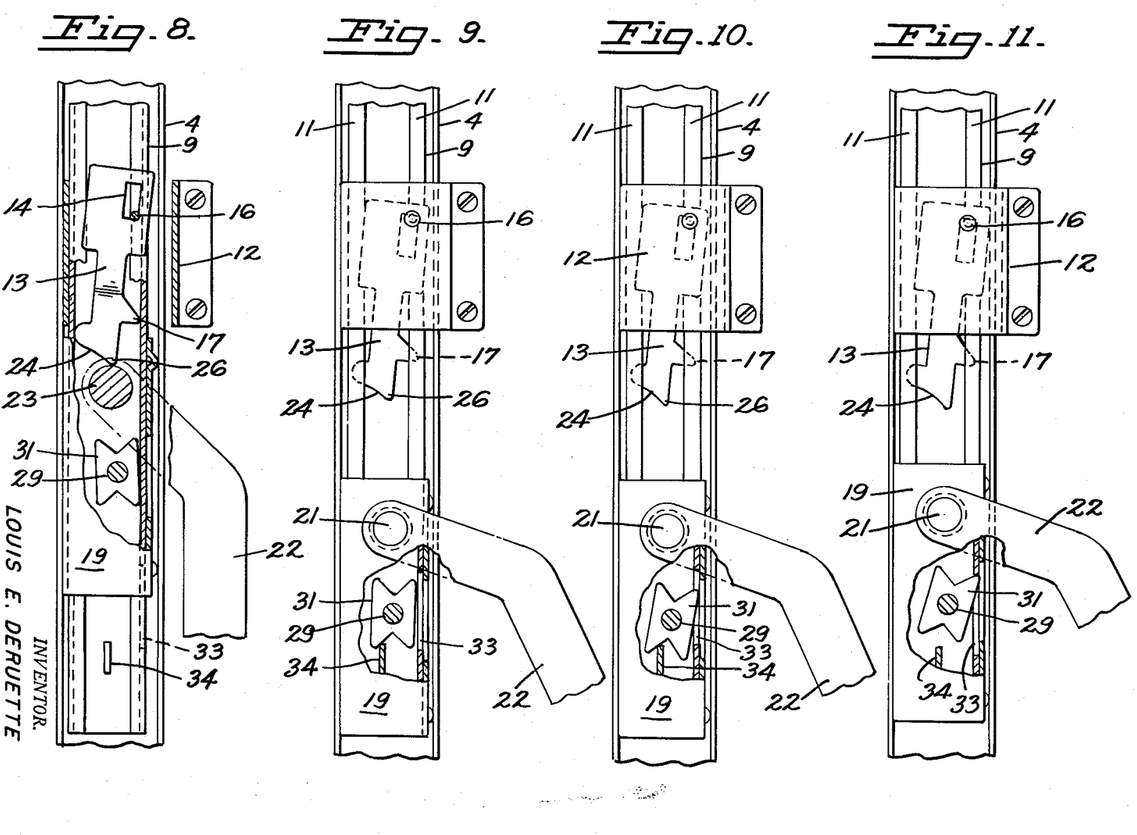
Fig. 8 is a partly sectional view of the control and locking mechanism as the lower sash is being closed while the upper sashes are open.
Fig. 9 is a partly sectional view of the control and locking mechanism while the lower sash is being opened to pick up the upper sashes.
Fig. 10 is a partly sectional view of the control and locking mechanism when the lower sash is opened the same angle as the upper sashes.
Fig. 11 is a partly sectional view of the control and locking mechanism at the start of all the sashes toward closed position in unison.

For selective connection between the tumbler case 19 and the travel channel 9 a trigger lug 34 is fixedly extended from the bottom of the travel channel 9. This trigger lug 34 is generally aligned with the lower portion of the tumbler slot 33 so as to engage the tumbler and turn the same as the tumbler 31 approaches the registering position with the tumbler slot 33. As it is shown in Fig. 9, as the tumbler case 19 is lowered by opening the lower sash or as the trigger lug 34 is raised by closing of the upper sashes, the trigger lug 34 engages one of the inner inclined edges of the adjacent point 32 of the tumbler 31 so that on subsequent relative movement the tumbler is turned as shown in Figs. 10 and 11 from the vertical toward an inclined position or projecting one of the opposite tumbler points 32 into the tumbler slot 33. This selective operation therefore takes place by permitting the opening and closing of the lower sash independently of the upper sashes as long as the movement of the tumbler is spaced above the trigger lug 34. In order to connect the sashes for unitary operation, the lower sash is opened sufficiently far to bring the lower tumbler points 32 in contact with the trigger lug 34 and turn the tumbler into engagement with the tumbler slot 33 then as the lower sash is closed the upper sashes are closed with it and when all the sashes are closed together in this manner even in the approximately closed position the bolt keeper slot 18 will align with the projection 17 for locking all the sashes in closed position. When both the keeper slot 18 and the tumbler slot 33 are respectively out of alignment with the projection 17 and the tumbler 31, then if thereafter the upper sashes are closed, the tumbler operating channel 9 is pulled upwardly and moves the tumbler lug 34 upwardly for turning the tumbler 31 into engagement with the tumbler slot 33, at the same time bringing the keeper slot 18 in registry with the projection 17 of the bolt 13 locking the upper window sashes to the lower sash for unitary operation so that neither could be opened then without opening the lower sash.

The keeper slot 18 is of sufficient length relatively to the projection 17 to allow the projection 17 to drop into the keeper slot when the upper sashes are approaching closed position. In other words if anyone attempts to close the upper sashes sufficiently to deceive a watchman but not to close it completely shut, the projection 17 will drop into the slot 18 just the same and will prevent the separate opening of the upper sashes unless and until the lower sash is unlatched from the inside.

The sequence of operation can be traced through the relative positions illustrated in Figs. 8 to 15 inclusive.

In Fig. 8 the lower sash is closing while the upper sashes remain open. The sash plate 22 is turned downward and the shoe or tumbler casing 19 is shifted upward. The tumbler 31 is in vertical longitudinal position and slides upwardly within the travel channel 9. The lock wedge 17 is above the lock keeper slot 18, hence the cam 23 abuts against the point 26 and pushes it up.

In Fig. 9 the lower sash is being opened until the tumbler 31 reaches the trigger lug 34 in a position ready to turn the tumbler 31 in clockwise direction viewing Fig. 9. The bolt 13 is allowed to drop downwardly and hang freely.

In Fig. 10 the lower sash is opened to the same angle as the upper sashes and the tumbler 31 is turned by the trigger lug 34 so as to turn the outer top point 32 thereof into the tumbler slot 33, ready to pick up the travel channel 9 upon the next closing of the lower sash.

In Fig. 11 the lower sash is about to be closed. The outer top point 32 of the tumbler 31 abuts against the top edge of the tumbler slot 33 so as to turn the tumbler into interlocking position with the travel channel 9, where the top points 32 will be jammed against the travel channel 9 to shift it upwardly with the tumbler casing 19 for closing all the sashes together.

Figures 12, 13:
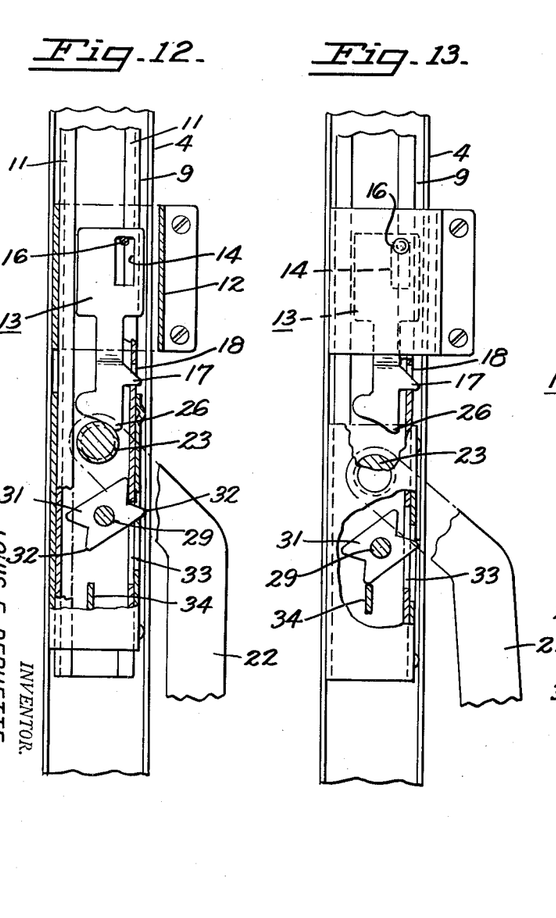
Fig. 12 is a partly sectional view of the control and locking mechanism in the locked position of all the sashes.
Fig. 13 is a partly sectional view of the control and locking mechanism as the lower sash is again initially opened.

Fig. 12 shows all the sashes closed. The keeper slot is aligned with the projection 17 which latter is pressed outwardly by the cam 24 into engagement with the keeper slot 18 so that the upper sashes cannot be opened without first opening the lower sash.

Figures 14, 15:
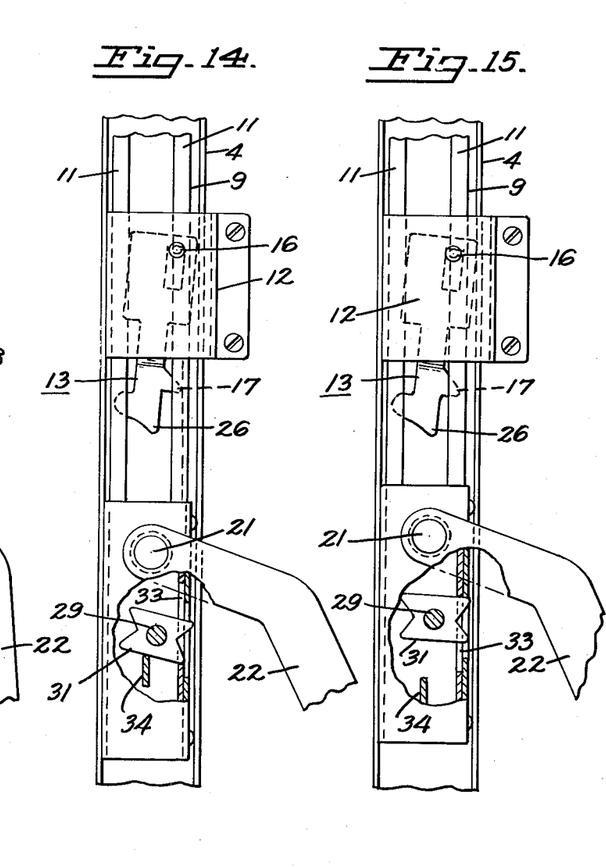
Fig. 14 is a partly sectional view of the control and locking mechanism as all the sashes are opened.
Fig. 15 is a partly sectional view of the control and locking mechanism in initial closed position.

Fig. 13 shows the lower sash opening to bring the tumbler 31 down against the trigger lug 34 so as to turn the tumbler 31 clockwise to the position shown in Fig. 14 so that both top points 32 project through the tumbler slot 33 and thus lock the channel 9 to the tumbler casing 19 for downward movement together for opening all the sashes.

Fig. 15 shows the beginning of the closing of the lower sash, whereby the tumbler 31 engages the upper edge of the tumbler slot 33 so as to be turned into the inoperative longitudinal position of Fig. 8.

Whenever the travel channel 9 is moved up to close the upper sashes, the keeper slot 18 is brought into alignment with the bolt projection 17 for locking the upper sashes in closed position until the travel channel 9 is pulled down by the opening of the lower sash.

In the modified form shown in Figs. 16 to 19 inclusive, a keeper slot 41 in a travel channel 42 is in the flange facing outside of the window. In this form the travel channel 42 extends to all the upper sashes. A lock bolt 43 is pivoted on the armplate pivot 21 and projects upwardly in the travel channel 42. A projection 44 extends from the free upper end of the bolt 43 toward and into the keeper slot 41. In the fixed strap 46 is an inwardly extended abutment pin 47. The head on the free end of the bolt 43 is curved so as to act as a cam 44 in engaging the pin 47 and forcing the wedge projection 44 toward and against the outer flange of the travel channel 42. This causes a firm frictional contact by the projection 44 whenever the lower sash is closed, as shown in Fig. 16. In this position the upper sashes are open and accidental closing of the upper sashes by wind action or the like is prevented.

The lower sash can be opened as shown in Fig. 17, without closing or disturbing the travel channel 42 or the upper sashes. Then by closing again the lower sash the tumbler is brought into channel lifting position as shown in Fig. 18 as heretofore described and the bolt 43 remains in upright position until its head hits the abutment pin 47 and then the bolt projection 44 is projected into the keeper slot 41 as shown in broken lines on Fig. 18 for holding the channel 42 for closing the upper sashes together with the lower sash and preventing the opening of the upper sashes without also opening the lower sash. The same interlocking can be accomplished by the closing of the upper sashes while the lower sash is closed. In this operation the channel 42 is pulled upwardly from the position shown in Fig. 16 until the keeper slot 41 is brought opposite the bolt projection 42.

In the aforementioned locking devices and selective operation, facility of manipulation of the sashes both separately and together is achieved, yet it is rendered absolutely impossible to open the upper sashes separately from the lower sash without unlatching and opening the lower sash from the inside. Consequently no burglar could enter by prying the upper sashes open as could be done in previous structures and controls. The device renders multiple sash windows entirely safe and fool proof so that the observing of the latches of the lower sash is sufficient for a watchman to determine that all the multiple sashes are locked and not only loosely closed. The device is simple, easy to install and does not require any degree of skill in manipulation, therefore it is eminently adapted for its purposes.

I claim:

1. In a multiple sash window structure of the character described, the combination with a plurality of swingable sashes mounted on a frame and a connecting mechanism for operating said sashes, said mechanism being operable by manipulation of one of said sashes as a control sash to connect said sashes together for operation in unison and to permit independent operation of said control sash, said connecting mechanism including a travel member; of a locking mechanism to prevent the movement of said travel member for opening said sashes when said control sash is closed, comprising, a lock bolt supported for actuation by the closing of said sashes, and a keeper associated with said travel member for alignment and engagement with the lock bolt when said sashes are closed, said keeper being of such length as to be engageable by said lock bolt prior to the complete closing of said sashes as said sashes approach their closed position.

2. In a multiple sash window structure of the character described, the combination with a plurality of swingable sashes mounted on a frame and a connecting mechanism for operating said sashes, said mechanism being operable by manipulation of one of said sashes as a control sash to connect said sashes together for operation in unison and to permit independent operation of said control sash, said connecting mechanism including a travel member having longitudinal side flanges, and means to selectively connect said control sash to said travel member; of an element associated with the control sash for movement along said travel member, a lock bolt pivoted on said element and swingable against a longitudinal flange of said travel member, a keeper in said travel member aligned for engagement with said lock bolt when all the sashes are closed, and an abutment fixed relatively to and engaging said lock bolt when the control sash is closed to press said lock bolt against said flange of said travel member and into said keeper to restrain movement of said travel member relatively to said closed control sash.

3. In a multiple sash window structure of the character described, the combination with a plurality of swingable sashes mounted on a frame and a connecting mechanism for operating said sashes, said mechanism being operable by manipulation of one of said sashes as a control sash to connect said sashes together for operation in unison and to permit independent operation of said control sash, said connecting mechanism including a travel member having longitudinal side flanges, and means to selectively connect said control sash to said travel member; of an element associated with the control sash for movement along said travel member, a lock bolt pivoted on said element and swingable against a longitudinal flange of said travel member, a keeper in said travel member aligned for engagement with said lock bolt when all the sashes are closed, and an abutment fixed relatively to and engaging said lock bolt when the control sash is closed to press said lock bolt against said flange of said travel member and into said keeper to restrain movement of said travel member relatively to said closed control sash, said selectively connecting means including a tumbler pivoted on said movable element and located within said travel member, a keeper slot in a flange of said travel member engageable by said tumbler for moving said travel member with said element, and a trigger abutment in said travel member below said tumbler for abutting and turning said tumbler upon opening movement of the control sash relatively to said travel member.

4. In a multiple sash window structure of the character described, the combination with a plurality of swingable sashes mounted on a frame and a connecting mechanism for operating said sashes, said mechanism being operable by manipulation of one of said sashes as a control sash to connect said sashes together for operation in unison and to permit independent operation of said control sash, said connecting mechanism including a travel member having longitudinal side flanges, and means to selectively connect said control sash to said travel member; of an element associated with the control sash for movement along said travel member, a lock bolt pivoted on said element and swingable against a longitudinal flange of said travel member, a keeper in said travel member aligned for engagement with said lock bolt when all the sashes are closed, and an abutment fixed relatively to and engaging said lock bolt when the control sash is closed to press said lock bolt against said flange of said travel member and into said keeper to restrain movement of said travel member relatively to said closed control sash, said selectively connecting means including a tumbler pivoted on said movable element and located within said travel member, a keeper slot in a flange of said travel member engageable by said tumbler for moving said travel member with said element, and a trigger abutment in said travel member below said tumbler for abutting and turning said tumbler upon opening movement of the control sash relatively to said travel member, said trigger abutment being generally aligned with said keeper slot to coact therewith for sash opening movement of the travel member in unison with the opening of the control sash.

5. In a multiple sash window structure of the character described, the combination with a plurality of swingable sashes mounted on a frame and a connecting mechanism for operating said sashes, said mechanism being operable by manipulation of one of said sashes as a control sash to connect said sashes together for operation in unison and to permit independent operation of said control sash, said connecting mechanism including a travel member having longitudinal side flanges, and means to selectively connect said control sash to said travel member; of an element associated with the control sash for movement along said travel member, a lock bolt pivoted on said element and swingable against a longitudinal flange of said travel member, a keeper in said travel member aligned for engagement with said lock bolt when all the sashes are closed, and an abutment fixed relatively to and engaging said lock bolt when the control sash is closed to press said lock bolt against said flange of said travel member and into said keeper to restrain movement of said travel member relatively to said closed control sash, said selectively connecting means including a tumbler pivoted on said movable element and located within said travel member, a keeper slot in a flange of said travel member engageable by said tumbler for moving said travel member with said element, and a trigger abutment in said travel member below said tumbler for abutting and turning said tumbler upon opening movement of the control sash relatively to said travel member, said trigger abutment being generally aligned with said keeper slot to coact therewith for sash opening movement of the travel member in unison with the opening of the control sash, said tumbler having spaced pairs of points at each end thereof for engaging the travel member at the upper end of said keeper slot for moving the travel member in unison with the control sash for closing all of said sashes.

6. In a multiple sash window structure of the character described, the combination with a frame, a plurality of swinging sashes mounted in said frame, and connecting mechanism associated with said sashes for connecting said sashes together, said mechanism being capable of operation automatically by manipulation of one control sash to connect said sashes together for operation in unison or permit independent operation of said one sash; of a locking mechanism for locking the sashes together and preventing the opening of said sashes without first opening said control sash, comprising a fixed supporting element, a locking member slidably pivoted on said supporting element with freedom of longitudinal play, a projection on said locking member, a movable element in said mechanism moving with the opening of said sashes, and a keeper on said movable element aligned with said projection when said sashes are closed, said projection extending into said keeper when said sashes are closed for locking said sashes in closed position.

7. In a multiple sash window structure of the character described, the combination with a frame, a plurality of swinging sashes mounted in said frame, and connecting mechanism associated with said sashes for connecting said sashes together, said mechanism being capable of operation automatically by manipulation of one control sash to connect said sashes together for operation in unison or permit independent operation of said one sash, of a locking mechanism comprising a fixed supporting element on said window frame, a pivot on said supporting element, a locking member suspended from said pivot, said locking member having a longitudinally elongated pivot slot adapted to move longitudinally on said pivot, a projection on said locking member; said connecting mechanism including a travel member having a keeper aperture on one side thereof in alignment with said projection when all of said sashes are closed, said projection projecting into said aperture to lock said travel member against separate movement with respect to said control sash.

8. In a multiple sash window structure of the character described, the combination with a frame, a plurality of swinging sashes mounted in said frame, and connecting mechanism associated with said sashes for connecting said sashes together, said mechanism being capable of operation automatically by manipulation of one control sash to connect said sashes together for operation in unison or permit independent operation of said one sash, of a locking mechanism comprising a fixed supporting element on said window frame, a pivot on said supporting element, a locking member suspended from said pivot, said locking member having a longitudinally elongated pivot slot adapted to move longitudinally on said pivot, a projection on said locking member; said connecting mechanism including a travel member having a keeper aperture on one side thereof in alignment with said projection when all of said sashes are closed, said projection projecting into said aperture to lock said travel member against separate movement with respect to said control sash, a traveling shoe slidable longitudinally on said travel member, said control sash being connected to said traveling shoe for opening and closing according to the travel of said shoe, and a cam element in said shoe engaging the lower end of said locking member to push said locking member upwardly and outwardly toward engagement with said aperture.

9. In a mulitple sash window structure of the character described, the combination with a frame, a plurality of swinging sashes mounted in said frame, and connecting mechanism associated with said sashes for connecting said sashes together, said mechanism being capable of operation automatically by manipulation of one control sash to connect said sashes together for operation in unison or permit independent operation of said one sash, of a locking mechanism comprising a fixed supporting element on said window frame, a pivot on said supporting element, a locking member suspended from said pivot, said locking member having a longitudinally elongated pivot slot adapted to move longitudinally on said pivot, a projection on said locking member; said connecting mechanism including a travel member having a keeper aperture on one side thereof in alignment with said projection when all of said sashes are closed, said projection projecting into said aperture to lock said travel member against separate movement with respect to said control sash, a shoe associated with the control sash and movable along said travel member, and a cam element in said shoe adjacent said travel member for engaging said locking member when said control sash is closed and urging said locking member upwardly and toward the side where said aperture is located.

10. In a multiple sash window structure of the character described, the combination with a frame, a plurality of swinging sashes mounted in said frame, and connecting mechanism associated with said sashes for connecting said sashes together, said mechanism being capable of operation automatically by manipulation of one control sash to connect said sashes together for operation in unison or permit independent operation of said one sash, of a locking mechanism comprising a fixed supporting element on said window frame, a pivot on said supporting element, a locking member suspended from said pivot, said locking member having a longitudinally elongated pivot slot adapted to move longitudinally on said pivot, a projection on said locking member; said connecting mechanism including a travel member having a keeper aperture on one side thereof in alignment with said projection when all of said sashes are closed, said projection projecting into said aperture to lock said travel member against separate movement with respect to said control sash, a shoe associated with the control sash and movable along said travel member, a cam element in said shoe adjacent said travel member for engaging said locking member when said control sash is closed and urging said locking member upwardly and toward the side where said aperture is located, a pivoted tumbler on said shoe adjacent said travel member, a tumbler keepr slot in said travel member engageable by said tumbler for moving said travel member in unison with said control sash, and a trigger abutment on said travel member for turning said tumbler upon movement of said control sash and shoe relatively to said travel member for releasing or engaging said tumbler with said tumbler slot.

References Cited in the file of this patent

UNITED STATES PATENTS

| | | |
|---|---|---|
| Re. 20,878 | Wiley | Oct. 4, 1938 |
| 2,158,714 | Wiley | May 16, 1939 |
| 2,232,297 | Wiley | Feb. 18, 1941 |
| 2,598,619 | Strand | May 27, 1952 |
| 2,639,474 | Wiley | May 26, 1953 |